(12) United States Patent
Gauthier et al.

(10) Patent No.: US 10,704,783 B2
(45) Date of Patent: Jul. 7, 2020

(54) HIGH TEMPERATURE FLUID GENERATOR

(71) Applicant: THERMODESIGN INC., Boucherville, Quebec (CA)

(72) Inventors: Rejean Gauthier, Mont Saint-Hilaire (CA); Robert Audet, St-Hyacinthe (CA)

(73) Assignee: Thermodesign, Inc (FR)

(*) Notice: Subject to any disclaimer, the term of this patent is extended or adjusted under 35 U.S.C. 154(b) by 184 days.

(21) Appl. No.: 15/107,394

(22) PCT Filed: Dec. 23, 2014

(86) PCT No.: PCT/IB2014/067288
§ 371 (c)(1),
(2) Date: Jun. 22, 2016

(87) PCT Pub. No.: WO2015/097676
PCT Pub. Date: Jul. 2, 2015

(65) Prior Publication Data
US 2017/0023240 A1    Jan. 26, 2017

Related U.S. Application Data

(60) Provisional application No. 61/920,001, filed on Dec. 23, 2013.

(51) Int. Cl.
*F22D 1/20* (2006.01)
*F28G 15/00* (2006.01)
(Continued)

(52) U.S. Cl.
CPC ............. *F22D 1/20* (2013.01); *F24H 1/14* (2013.01); *F24H 1/406* (2013.01); *F24H 1/41* (2013.01);
(Continued)

(58) Field of Classification Search
CPC .. B23P 19/024; Y10T 29/53117; F22B 17/10; F22B 21/34; F24H 1/406;
(Continued)

(56) References Cited

U.S. PATENT DOCUMENTS

| 1,993,072 A | * | 3/1935 | Murray | F22B 21/34 |
| | | | | 122/235.12 |
| 2,904,016 A | * | 9/1959 | Durham | F22B 21/341 |
| | | | | 122/336 |

(Continued)

FOREIGN PATENT DOCUMENTS

| CA | 2205452 A1 | 11/1998 | |
| GB | 1473072 A | * 5/1977 | ............. F24H 1/406 |
| WO | WO 2012117621 A1 | * 9/2012 | ............... F23J 15/06 |

OTHER PUBLICATIONS

International Search Report of PCT/IB2014/067288.
Written Opinion of PCT/IB2014/067288.
Supplementary European Search Report for EP 14 87 3665.

Primary Examiner — Steven S Anderson, II
(74) Attorney, Agent, or Firm — Forge IP, PLLC

(57) ABSTRACT

A high temperature fluid generator is configured to heat a fluid (e.g. water; thermal oil or the like) to a high temperature (e.g. greater than 250 degrees Fahrenheit or 120 degrees Celsius) using a fuel-burning furnace. The generator generally comprises a furnace module, wherein fuel is burned, and a convection module where the combustion gases are put in contact with a series of fluid-bearing convection tubes. The furnace module comprises a series of fluidly interconnected headers, some of which are also fluidly connected to the convection tubes in the convection modules. The various headers contribute to the overall structure of the generator. The convection tubes are arranged into at least two bundles which are movably mounted in the convection module of the (Continued)

generator such to be movable in and out of the convection module for inspection, cleaning, maintenance and/or repair.

38 Claims, 14 Drawing Sheets

(51) Int. Cl.
    *F24H 9/14* (2006.01)
    *F24H 1/14* (2006.01)
    *F24H 1/40* (2006.01)
    *F24H 1/41* (2006.01)
    *F24H 9/06* (2006.01)

(52) U.S. Cl.
    CPC ............... *F24H 9/06* (2013.01); *F24H 9/14* (2013.01); *F28G 15/00* (2013.01); *F28F 2280/02* (2013.01); *Y02B 30/108* (2013.01)

(58) Field of Classification Search
    CPC ..... F24H 9/06; F24H 1/41; F24H 1/14; F24H 9/14; F28F 2280/02; F28F 2280/10; F28G 15/00; Y02B 30/108; F22D 1/20
    See application file for complete search history.

(56) References Cited

U.S. PATENT DOCUMENTS

| | | | | |
|---|---|---|---|---|
| 2,994,308 | A * | 8/1961 | Stabenow | F22B 21/36 |
| | | | | 122/406.1 |
| 3,030,938 | A | 4/1962 | Vorkauf | |
| 3,081,749 | A * | 3/1963 | Stabenow | F24H 1/406 |
| | | | | 122/406.3 |
| 3,426,733 | A | 2/1969 | Von Weisenthal | |
| 4,028,884 | A * | 6/1977 | Martz | F01K 23/108 |
| | | | | 60/39.182 |
| 4,138,969 | A * | 2/1979 | Thompson | F28F 11/00 |
| | | | | 122/421 |
| 4,196,700 | A * | 4/1980 | Keseru | F24H 1/406 |
| | | | | 122/235.14 |
| 4,387,669 | A * | 6/1983 | Brown | F24H 1/0045 |
| | | | | 122/235.23 |
| 4,494,485 | A * | 1/1985 | Kendall | C10G 9/20 |
| | | | | 122/250 R |
| 5,339,891 | A * | 8/1994 | Kidaloski | F22B 37/001 |
| | | | | 122/494 |
| 7,958,933 | B2 * | 6/2011 | Castello | F22B 31/045 |
| | | | | 122/510 |
| 2003/0131977 | A1 * | 7/2003 | West | F28D 7/1676 |
| | | | | 165/159 |
| 2010/0314083 | A1 * | 12/2010 | Williams | F28B 1/02 |
| | | | | 165/162 |
| 2011/0209697 | A1 * | 9/2011 | Plotkin | F24J 2/07 |
| | | | | 126/663 |
| 2013/0327510 | A1 * | 12/2013 | Kamiyama | F23J 15/06 |
| | | | | 165/172 |

* cited by examiner

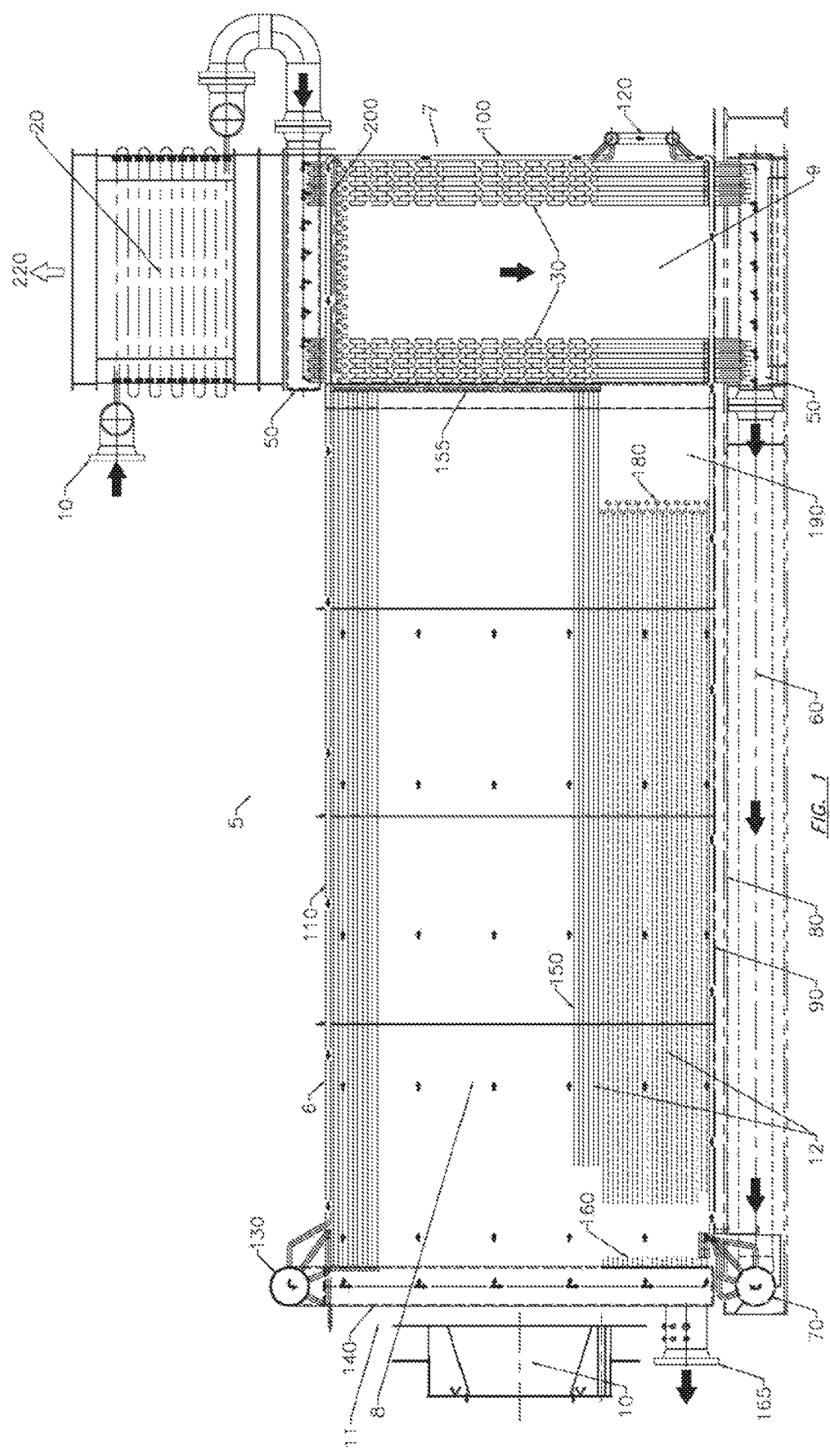

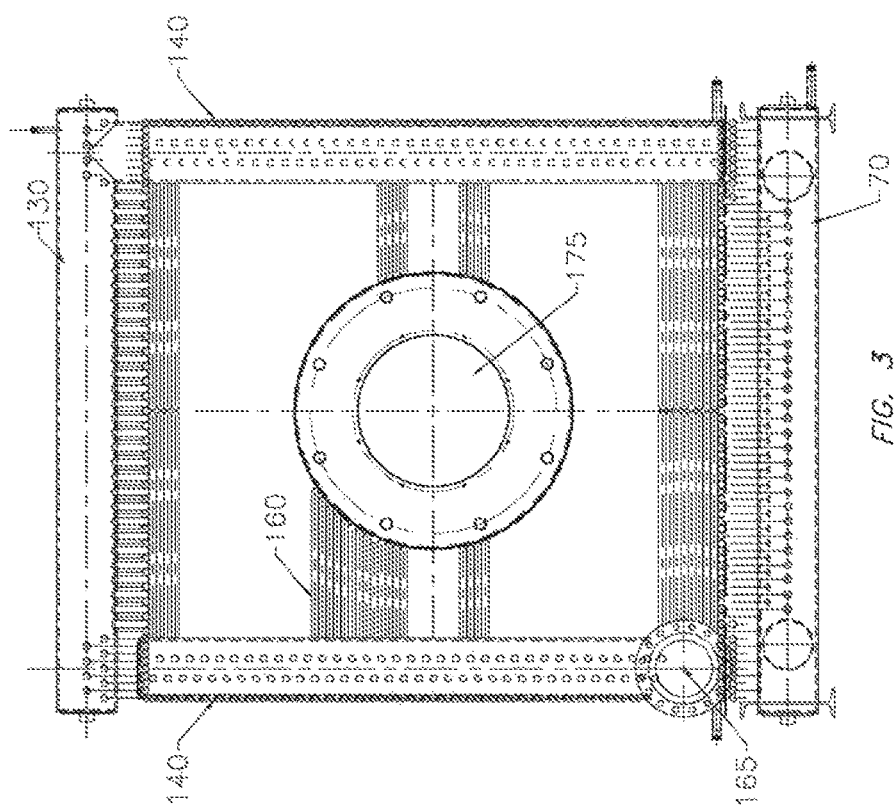
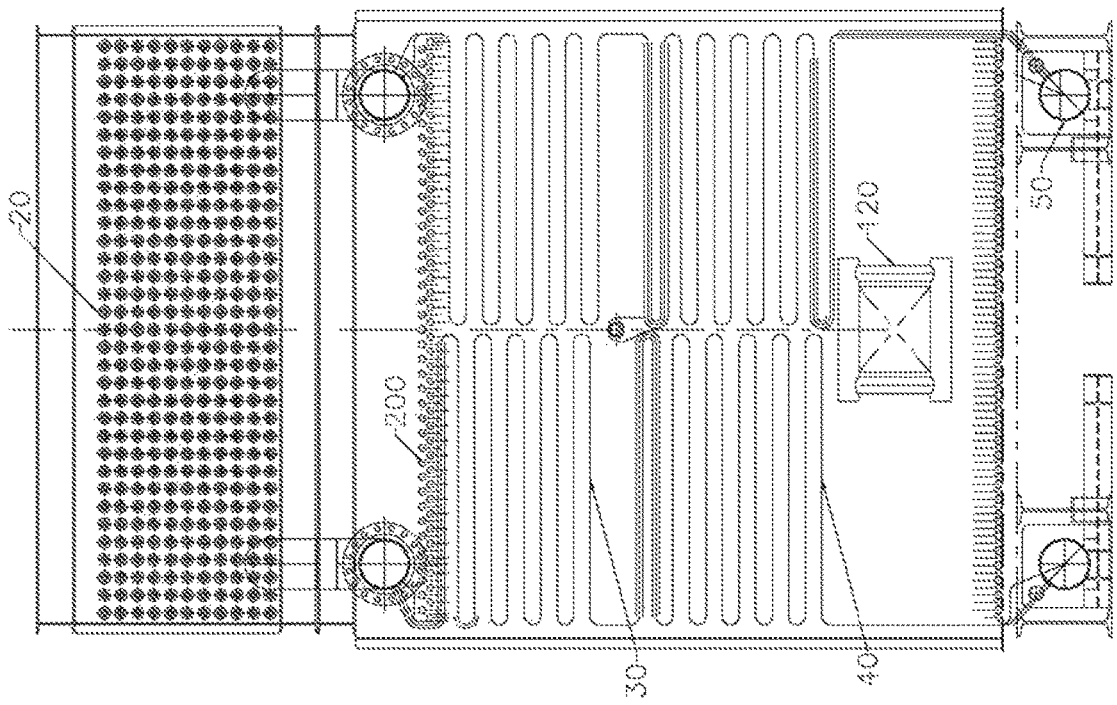

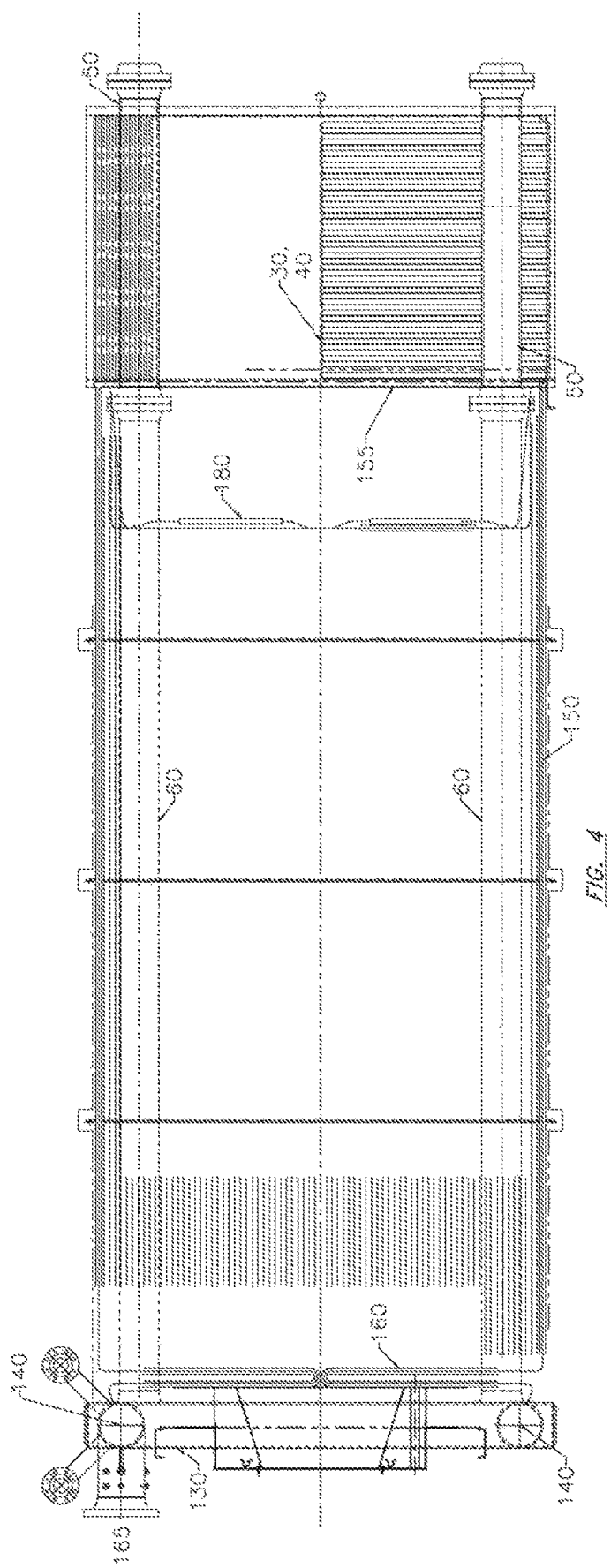

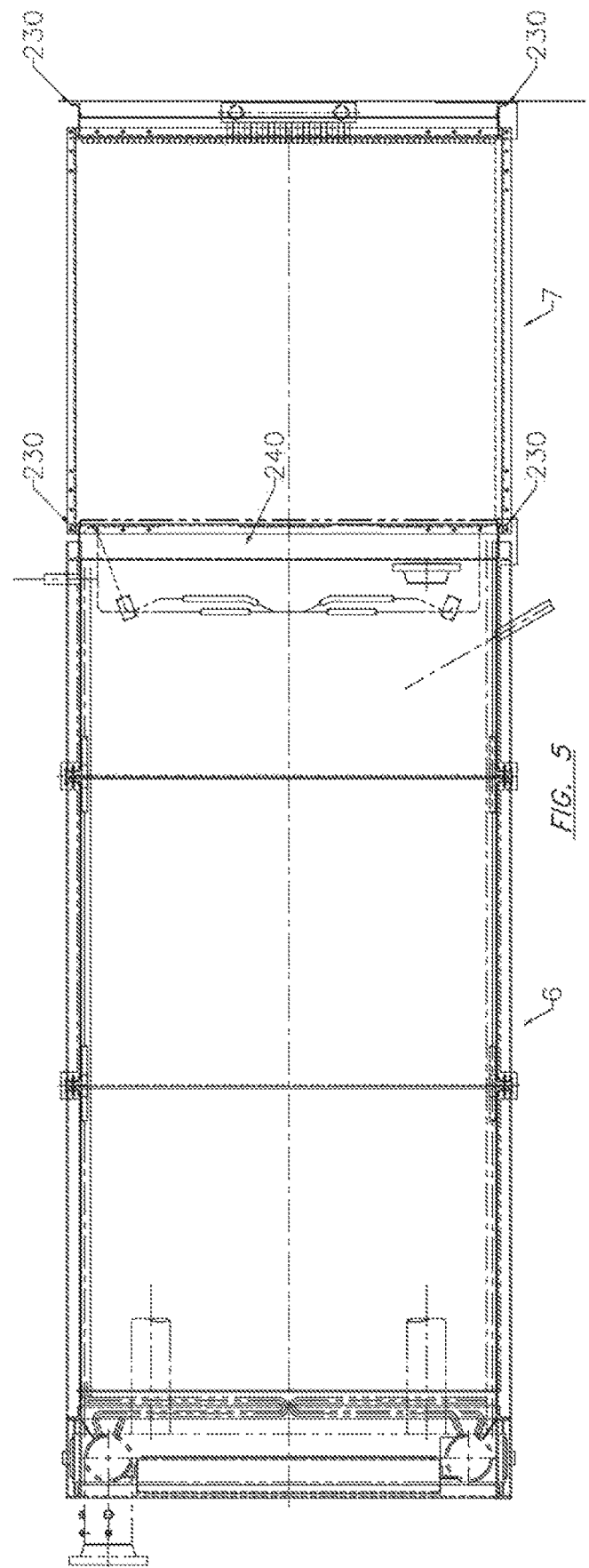

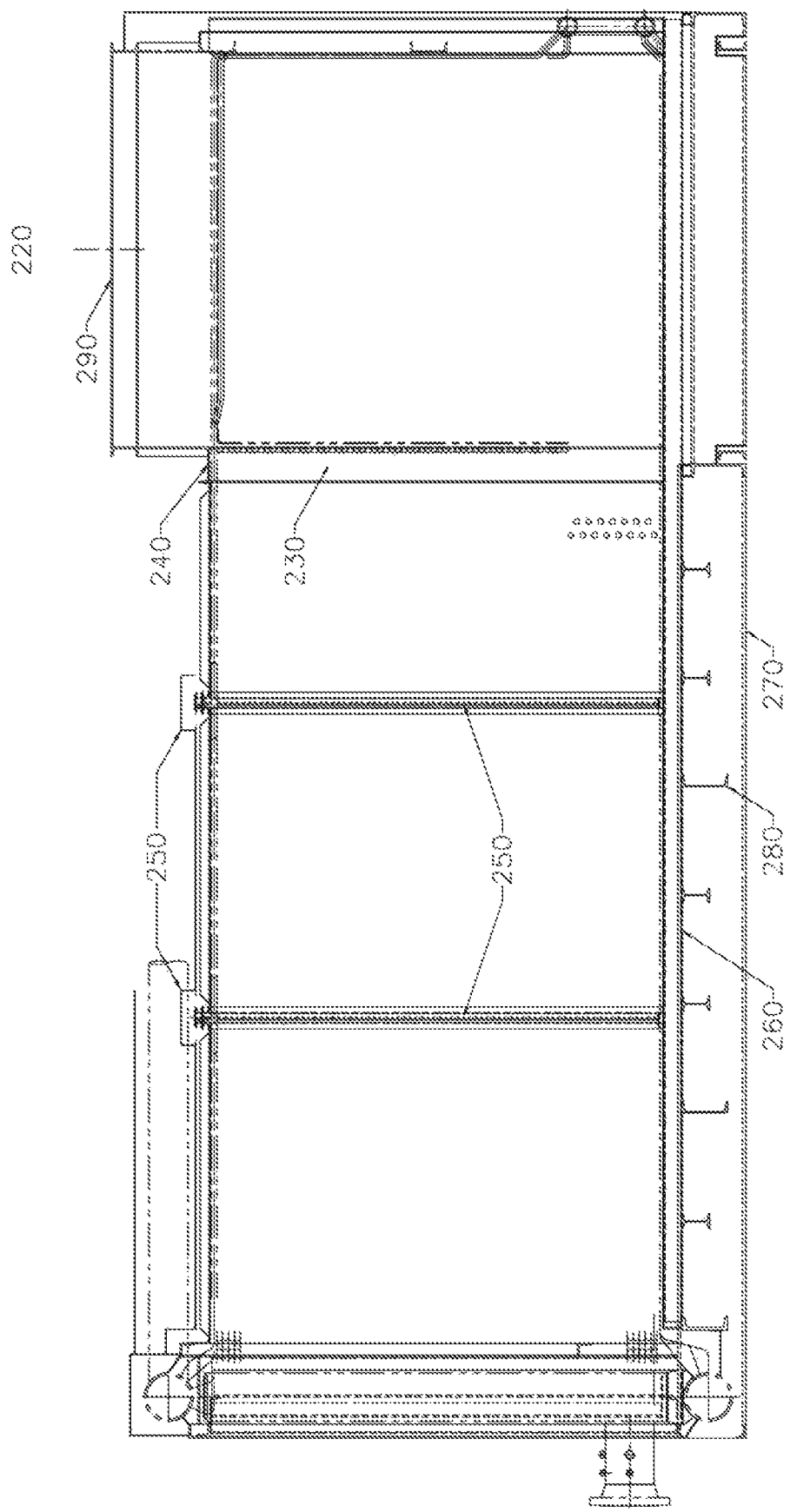

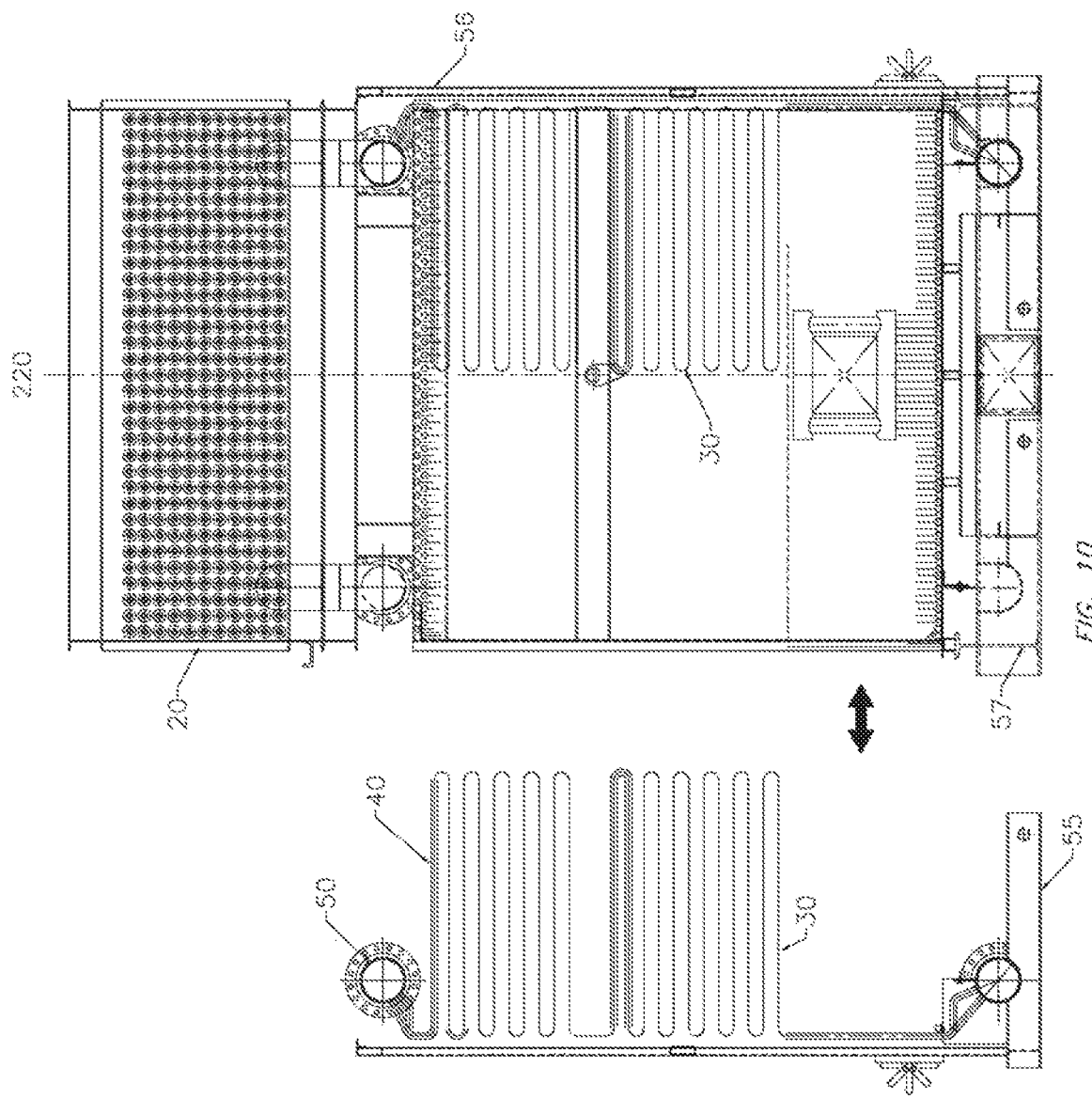

Figure 11

HIGH TEMPERATURE FLUID GENERATOR

CROSS-REFERENCE TO RELATED APPLICATIONS

The present patent application claims the benefits of priority of U.S. Patent Application No. 61/920,001, entitled "High Temperature Fluid Generator" and filed at the United States Patent and Trademark Office on Dec. 23, 2013.

FIELD OF THE INVENTION

The present invention generally relates to boilers and other high temperature fluid generators.

BACKGROUND OF THE INVENTION

Hot fluid generators are well known in the art and many designs exist. When referring to hot water or hot fluid, reference is generally made to water or fluid having a desired temperature exceeding 250 Fahrenheit (about 120 degrees Celsius). Furthermore, reference is generally made to fluid since most hot fluid generators may be used for heating water but also for heating thermal oils and other fluids.

Existing generators generally comprise a furnace module in which fuel is burned to generate heat, and a convection module connected to the furnace module and comprising a plurality of convection tubes or pipes in which the fluid to be heated circulates. In use, the hot combustion gases from the burned fuel flow in the convection module and around the convection tubes. As they pass around and contact the tubes, the gases transfer a portion of their heat to the tubes and thus to the fluid which is thereby heated.

Understandably, once a generator is assembled and installed, all the components are mostly fixed. Hence, when one or more convection tube needs to be repaired, cleaned or replaced, the configuration of the convection module makes it very difficult to access the convection tubes. The repairing, cleaning and/or replacing of convection tubes is thus a long and often labor-intensive process. This process can further incur prolonged downtimes of the generator with their attendance costs.

In addition, when high volumes of high-temperature fluid are needed, current generators rely on the use of refractory to isolate the walls of the furnace module of the generator. Such design implies that the generator is both cumbersome and heavy, and may not be adapted for some uses.

Hence, despite ongoing developments in the field of high temperature fluid generators, there is still a need for an improved high temperature fluid generator which mitigates at least some of the shortcomings of the prior art.

SUMMARY OF THE INVENTION

At least some shortcomings of the prior art are mitigated by a high temperature fluid generator in which convection tubes are movably mounted such to as to be movable in and out of the generator for maintenance (inspection, cleaning, and/or repair or the like) and in which the furnace comprises heating tubes extending in the floor, ceiling, side walls, rear and front wall substantially completely covering the combustion chamber and thereby cooling the furnace chamber.

Hence, a high temperature fluid generator in accordance with the principles of the present invention generally comprises a furnace module and a convection module.

The convection module generally comprises a plurality of convection tubes in which the fluid to be heated circulates. The convection module is in communication with the furnace module such as to receive the hot combustion gases resulting from the burning of fuel in the furnace chamber of the furnace module. As the combustion gases flow in the convection module, they contact the convection tubes and transfer at least part of their heat to the tubes and thus to the fluid circulating in them.

For its part, the furnace module comprises a plurality of fluidly interconnected headers, some of which are also fluidly connected to the convection tubes to receive heated fluid therefrom.

In accordance with a broad aspect of the present invention, the convection tubes are arranged into at least two bundles or groups of tubes, each group being movably mounted to the convection module such as to be able to be moved in and out of the convection module.

By allowing the groups of convection tubes to be temporarily moved out of the convection module, inspection, cleaning, maintenance and/or repair of the convection tubes become significantly easier and faster to perform, and allows such operation to be performed in a smaller environment.

In typical yet non-limitative embodiments, the groups of convection tubes are slidingly mounted to the convection module such as to be slidable in and out of the convection module. In some of these embodiments, the groups of convection tubes are mounted on rails.

In accordance with another broad aspect of the present invention, the headers, which generally extend along the edges of the furnace module, are fluidly interconnected such as to form a path along which the fluid, pre-heated during its passage in the convection tubes, is further heated by the heat generated in the furnace.

In typical yet non-limitative embodiments, the headers also contribute to the overall structure of the generator, especially at the front of the generator.

In accordance with yet another broad aspect of the present invention, the furnace module comprises a network of heating tubes fluidly connected to the headers and extending in the floor, ceiling, rear wall, side walls and front wall of the furnace module and ceiling, floor and rear walls of the convection module.

The fluid circulating between the headers also circulates in the heating tubes such as to be heated by the combustion chamber.

Notably, by placing heating tubes in all the walls of the furnace module, the furnace chamber is effectively cooled by the fluid circulating in the heating tubes. As a large portion of the heat generated by the furnace is transferred to the fluid circulating in the heating tubes, the furnace chamber needs not be insulated using heavy refractory material, making the generator generally lighter.

In addition, the cooling of the walls of the furnace module with the heating tubes contributes to the reduction of the starting up and cooling off period of the generator, and also contributes to the reduction of the level of nitrogen oxides generated by the combustion process as the furnace temperature would be cooler. Also, such new arrangement, by removing the refractory material, allows for the elimination of hot points on the side walls of the convection module typically found in prior art.

Hence, a high temperature fluid generator in accordance with the principles of the present invention generally allows an easier access to the convection tubes as they are movable in and out of the convection module. Furthermore, the presence of heating tubes in the floor, ceiling and all walls of the furnace module generally eliminates the need for heavy refractory material to insulate the furnace chamber, making the generator lighter and generally more efficient.

According to one aspect of the present invention, a high temperature generator for heating a fluid is disclosed. The generator comprises a furnace module typically having a combustion chamber adapted for producing heat and hot combustion gases and a plurality of cooling tubes covering at least partially the combustion chamber for cooling the combustion chamber, and a convection module having a plurality of convection tubes fluidly connected with the cooling tubes of the furnace module. The convection module is in communication with the furnace module to receive the hot combustion gases from the furnace module for heating the convection tubes. The fluid generally circulates in the convection tubes where the fluid is heated before circulating into the cooling tubes where the fluid is further heated by the combustion chamber. According to one aspect of the present invention the combustion chamber of the furnace module is covered by the cooling tubes and the convection module is covered by some of the convection tubes, these tubes forming as such a top, floor, rear, front and side walls of the generator. The generator may further comprise fluidly interconnected headers fluidly connected to the convection tubes to receive heated fluid therefrom. The headers may extend along at least one of the walls of the generator contributing as such to the structure of the generator. The headers preferably form a path along the convection and furnace modules in order to further heat the fluid with the heat from the modules.

According to one aspect of the present invention, the convection tubes are arranged in the convection module to form at least two bundles of tubes wherein each bundle of convection tubes may be movably mounted into the convection module. Each bundle of convection tubes may also be movably mounted in an enclosure of the convection module.

According to one aspect of the present invention, each bundle of tubes is preferably adapted to be moved in or out of the convection module, wherein each bundle of tubes may be slidingly mounted on rails, wheels or hydraulics. The generator may further comprising frame elements to support the bundles. The convection tubes may be in serpentine from a top to a bottom of the convection module. The convection tubes are arranged in a staggered pattern in the convection module.

According to one aspect of the present invention, the convection module further comprises a finned tube convection section located above the convection module, the finned tube section comprising finned convection tubes fluidly connected to the convection tubes of the convection module for further heating the fluid. The convection module may comprise structural frame elements to support the convection tubes and the finned tube convection section. The furnace module and the convection module may be in fluid communication through a rear access gas outlet allowing the hot combustion gases to flow from the furnace chamber to the convection module. The generator may further comprise a gas outlet operatively connected to the convection module to evacuate the gas from the generator. The convection tubes may also be covered with a gas tight steel inner casing reinforced for pressure firing. The heated fluid according to one aspect of the present invention may be fluid an aqueous fluid, a thermal oil or a mixture thereof, or a gas. The fluid may also be water, glycol or mixture thereof.

According to one aspect of the present invention, a high temperature generator for heating a fluid is disclosed. The generator typically comprises a furnace module comprising a combustion chamber adapted for producing heat and hot combustion gases, and a convection module comprising a plurality of convection tubes movably mounted in the convection module, the convection module being in communication with the furnace module to receive the hot combustion gases from the furnace module for heating the convection tubes, wherein the fluid circulates in the convection tubes where the fluid is heated. The convection tubes may be arranged in the convection module to form at least two bundles of tubes. According to one aspect of the present invention, the generator is used to generate high temperature fluid.

According to one aspect of the present invention, a method for maintenance of a high temperature fluid generator having removably mounted bundles of convection tubes is disclosed. The method generally comprises the steps of moving out at least one of the removably mounted bundles, effecting maintenance work on the generator after having moved out the at least one the removably mounted bundles, and moving in the at least one moved out removably mounted bundle after maintenance has been completed. The method may further comprise the step of disconnecting the at least one removably mounted bundle before moving out the at least one removably mounted bundles. The method may further comprise the step of reconnecting the at least one moved in removably mounted bundle.

According to one aspect of the present invention, a method for producing high temperature fluid is disclose. The method typically comprising the steps of injecting a fluid through convection tubes of a convection module for heating the fluid and injecting the fluid heated in step a) through cooling tubes surrounding a combustion chamber producing heat and hot combustion gases, the fluid cooling the combustion chamber while being further heated by the combustion chamber, wherein the convection module is in communication with the combustion chamber such as to receive the hot combustion gases from the combustion chamber for heating the convection tubes.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 1 is a right side view of an embodiment of a high temperature fluid generator according to the principles of the present invention;

FIG. 2 is a rear view of the high temperature fluid generator of FIG. 1;

FIG. 3 is a front view of the high temperature fluid generator of FIG. 1;

FIG. 4 is a top view of the high temperature fluid generator of FIG. 1;

FIG. 5 is a top view of the structural members of the high temperature fluid generator of FIG. 1;

FIG. 6 is a right side view of the structural members of the high temperature fluid generator of FIG. 1;

FIG. 10 is a rear view of the structural members of the high temperature fluid generator of FIG. 1, with the convection modules, one of which is shown in open position, and comprising a finned tube convection section;

FIG. 11 is a perspective view of another embodiment of a high temperature fluid generator according to the principles of the present invention;

DETAILED DESCRIPTION OF THE PREFERRED EMBODIMENT

Figure 7:
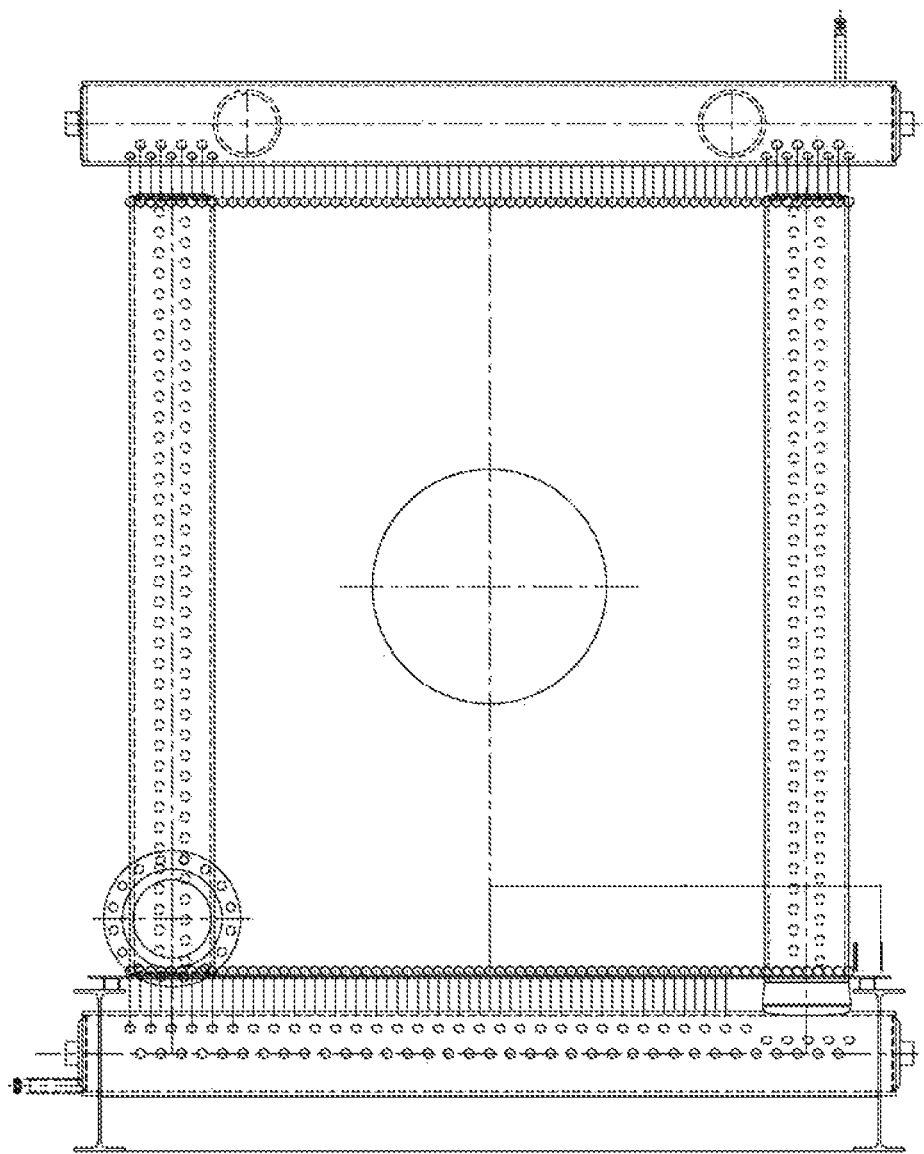
FIG. 7 is a front view of the headers as structural members of the high temperature fluid generator of FIG. 1.

A novel high temperature fluid generator will be described hereinafter. Although the invention is described in terms of specific illustrative embodiments, it is to be understood that the embodiments described herein are by way of example only and that the scope of the invention is not intended to be limited thereby.

Referring first to FIG. 1, an embodiment of a generator 5 in accordance with the principles of the present invention is shown. The generator 5 is configured to burn fuel to produce high-temperature (e.g. greater than 120 degrees Celsius) fluids for various purposes (e.g. heating).

Understandably, various fluids can be heated in generator 5 such as low or high temperature hot water, mixtures of water and glycols, thermal fluids, thermal oils and others. The present generator 5 is generally not limited to any particular fluid.

Referring to FIG. 1, the generator 5 generally comprises a furnace module 6 and a convection module 7 in communication with the furnace module 6.

As the name implies, the furnace module 6 generally comprises a furnace chamber 8 in which fuel (e.g. natural gas or oil) is burned to generate hot combustion gases which will be used to heat the fluid. In that sense, the furnace chamber 8 opens on the convection module 7 such that the combustion gases can flow from the furnace module 6 into the convection module 7.

For its part, the convection module 7 generally comprises an enclosure 9 into which are located a plurality of convection tubes 30 as shown in FIG. 1. As best shown in FIG. 2, in the present embodiment, the plurality of convection tubes 30 are arranged in two groups or bundles 40 of tubes 30 running in serpentine fashion from top to bottom in a staggered tube pattern. When the tubes 30 are arranged in such configurations, they exhibit a large contact surface with the combustion gases, thereby increasing the heat transfer.

Referring now to FIG. 10, in the present embodiment, the two bundles 40 of tubes 30 are movably mounted in the enclosure 9 of the convection module 7 such as to be easily moved in and out of the enclosure 9 for inspection, cleaning, maintenance and/or repair purposes. Understandably, by allowing the bundles 40 of convection tubes 30 to be independently moved in and out of enclosure 9 of the convection module 7, inspection, cleaning, maintenance and/or repair of the convection tubes 30 is generally faster and easier as the tubes 30 are more readily accessible when they are moved out of the convection module 7.

Also, it allows such inspection, cleaning, maintenance and/or repair operations to be performed in a more confined environment compared to prior art. For example, prior art requires a further space behind the convection module, of the same length as the convection module, plus 8 inches (about 20 cm), in order to perform such operation, whereas, in the present embodiment, such operations may be performed by using the side passages on each side, of approximately 4 to 5 feet (about 1.2 to 1.5 m) wide, which are generally in all cases provided for in any installation, in order to allow general inspection.

In the present embodiment, the bundles 40 are configured to be slidable in and out of the convection module 7. In that sense, in the present embodiment, the bundles 40 are mounted on rails 55. Still, in other embodiments, the mechanism allowing bundles 40 to be moved in and out of the convection module 7 could be different (e.g. wheels, hydraulic pistons, etc.).

Understandably, since the convection tubes 30 are fluidly connected to other fluid carrying pipes, the convection module headers 50 must be disconnected from the other pipes prior to be moved out of the convection module 7. Once the inspection, cleaning, maintenance and/or repair of the tubes 30 is completed, the tubes 30 can be moved back in the convection module and reconnected to the other pipes. Since the fluid circulating in the tubes 30 is likely to be under pressure, the module headers 50 are typically reconnected to the other pipes via bolted joints with gaskets. Other forms of fluid-tight connections are also possible.

As the skilled addressee will understand, since the convection tubes 30 are movable in and out of the convection module 7, they do not contribute to the structural strength of the convection module 7. Hence, the structural frame elements 56 and 57 of the enclosure 9 of the convection module 7 should be strong enough to support the convection tubes 30 and any other structures that could be put on top of it such as, but not limited to, a finned tube convection section 20 (see FIG. 10) and a stack 220 (see FIGS. 1 and 10).

Referring back to FIGS. 1 to 4, the furnace module 6 will now be described.

The furnace module 6 generally comprises an internal furnace chamber 8 in which fuel is burned as mentioned above. In that sense, the furnace chamber 8 comprises a burner opening 10 to receive the burner (not shown), the burner opening 10 being generally located in the front wall 11 of the furnace module 6, and a rear access 190 for gas outlet allowing the furnace chamber 8 and the convection module 7 to be in fluid communication. The gas outlet 190 allows the hot combustion gases to flow from the furnace chamber 8 to the convection module 7.

As shown in FIGS. 1 to 4, the furnace module 6 comprises a series of fluidly interconnected headers into which the fluid to be heated can circulate. In the present embodiment, the headers comprises two lateral floor or bottom headers 60, a front floor or bottom header 70, a front ceiling or top header 130, and two front side headers 140.

The floor headers 60 extend along the floor of the convection module 7 and of the furnace chamber 8 and generally along the lateral edges of the generator 5. The floor and ceiling front headers 70 and 130 extend respectively along the floor and along the ceiling of the furnace chamber and generally along the horizontal front edges of the generator 5. Finally, the two front headers 140 extend along the front wall of the furnace chamber 8 and generally along the vertical front edges of the generator 5.

Still referring to FIGS. 1 to 4, the furnace module 6 further comprises a network of heating tubes 12 extending in a tangential fashion along the floor, side walls, rear walls, ceiling and front wall of the furnace module 6 and into which the fluid to be heated circulate. These heating tubes 12 generally serve two main purposes.

First, the heating tubes, by being located along the floor, ceiling and various walls of the furnace module, further collect heat to be transferred to the fluid circulated in them. As such, these tubes generally improve the efficiency of the generator 5 as more heat is collected and transferred to the fluid.

Second, as the heating tubes further collect heat from the furnace chamber 8, the latter needs not be insulated with refractory materials as in prior art generators. By avoiding the need for refractory insulation, the present generator is generally lighter than prior art generators insulated with refractory materials and is also generally more efficient as the heating tubes generally reduce the starting up and cooling off period of the generator. Replacing the refractory surfaces by fluid cooled tubes 12 increases the heating surfaces and renders thereby the generator more efficient.

Typically, when combined with the use of a finned tube convection section 20, the resulting increase of the heating surfaces compared to prior art is between 60 to 80% for the generator of the smaller type described hereafter and between 80% to 90% for the generator of the larger type described hereafter.

As shown in FIGS. 5-7, to provide structural strength to the generator 5, the generator 5 comprises a plurality of members. The vertical structural steel members 230 located vertically at each corner of the convection module 7 act as a frame for the convection module 7. Horizontal structural steel members 240 connect horizontally the corner members 230. The tubes are kept in line and held together by structural steel shapes 250 so arranged as to provide strength against furnace pressure and provide also for thermal expansion. The quantity of such joints may vary according to the generator size.

The generator base 260, as shown in FIG. 6, is made of longitudinal structural steel shapes 270, and transversal structural steel shapes 280 to form a strong basis for the pressure parts. A gas outlet 290 is provided to connect to a stack 220 or to the finned tube convection section 20, if present, as shown in FIG. 1 and FIG. 10.

Figure 9:
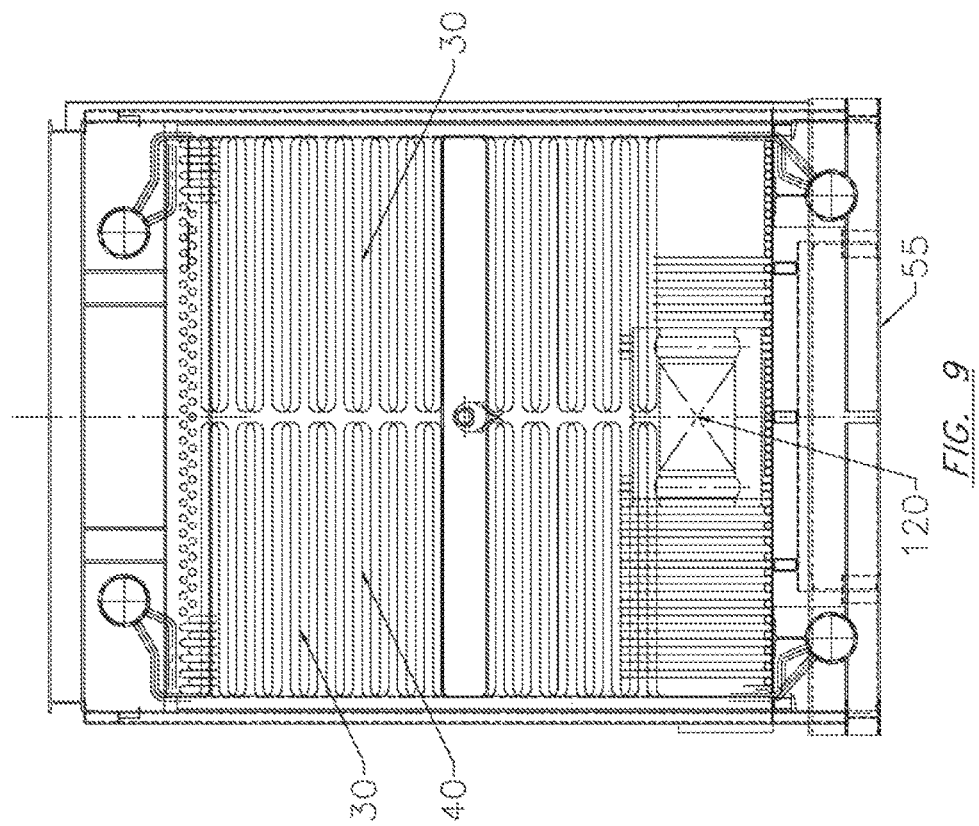
FIG. 9 is a rear view of the structural members of the high temperature fluid generator of FIG. 1, with the convection modules.
Figure 8:
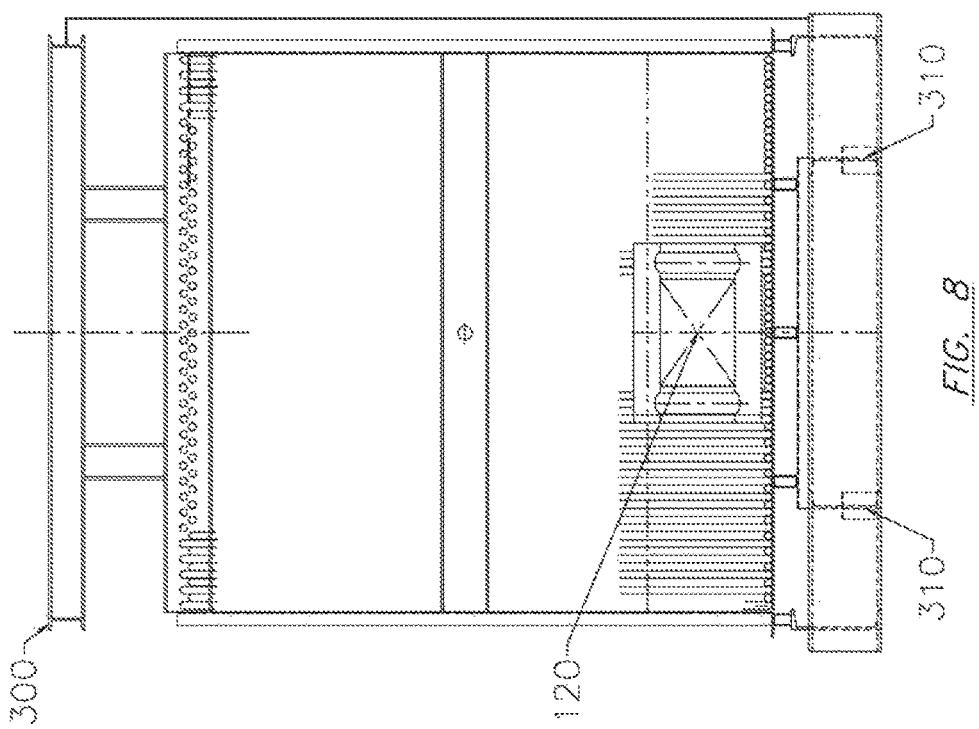
FIG. 8 is a rear view of the structural members of the high temperature fluid generator of FIG. 1, without the convection modules.
Figure 12:
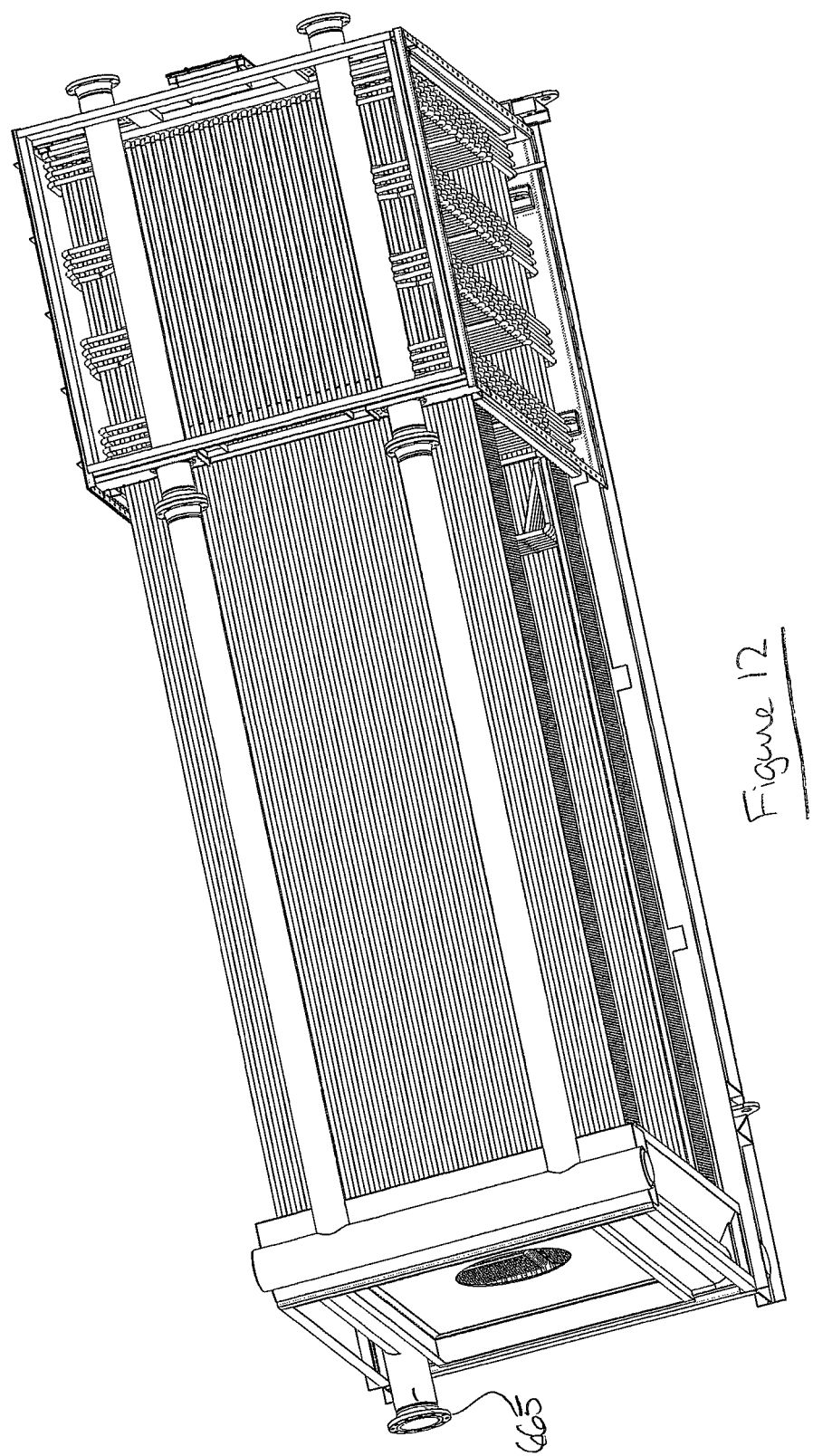
FIG. 12 is a top perspective view of the high temperature fluid generator of FIG. 11.
Figure 13:
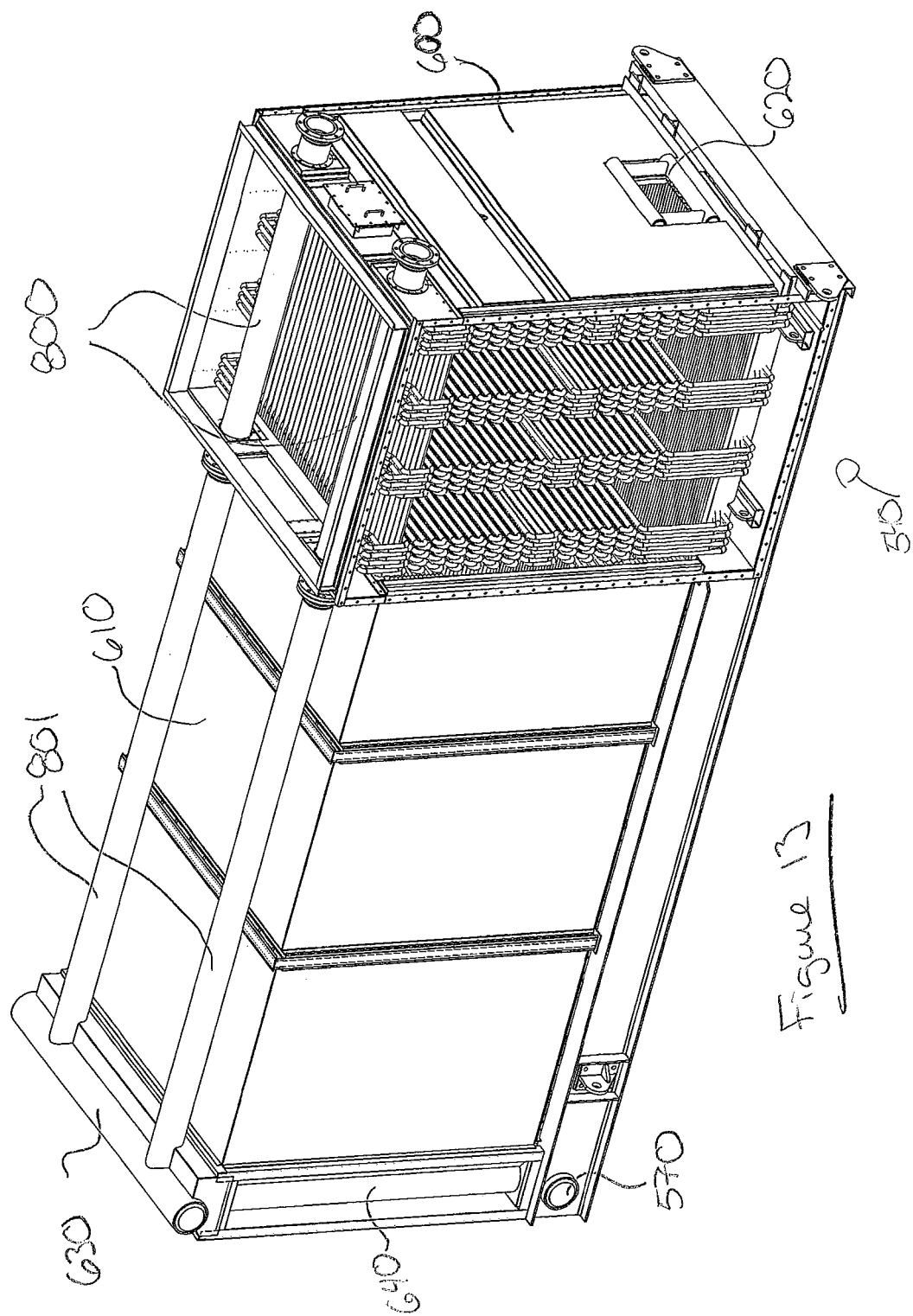
FIG. 13 is a rear perspective view of the high temperature fluid generator of FIG. 11.

As shown in FIGS. 8-10, the outlet frame 300 is shown, as well as the bundles 40 comprising tubes 30, which are on rails 55 to allow the bundles 40 to be slid out as shown in FIG. 10. The access door 120 provides entry below the bundles 40 and to the furnace for inspection and maintenance. Additional structural members 310 complete the generator frame providing an access to underneath the generator.

Referring now to FIGS. 1-4, in use, the incoming hot fluid enters the inlet top header 10 which distributes the fluid to a finned tube convection section 20, then to the two bundles 40 of convection tubes 30. Understandably, the convection tubes 30 are contacted by the hot combustion gases outputted by the furnace chamber 8. These hot combustion gases heat the tubes 30 and the fluid circulating in them.

When the fluid reaches the bottom of the convection tubes 30, it flows into the bottom headers 60 on each side and is brought to the front bottom header 70 from underneath the furnace floor 80, to feed the generator floor 90, rear wall 100 and ceiling 110 heating tubes where they are tangent. In the convection rear wall 100, there is an access door 120 provided for inspection, maintenance and repairs, if need be.

After having circulated in the heating tubes 110, the hot fluid flows into the top front header 130 and is then fed to one of the side headers 140 to feed the front wall tubes 160 on one side, and the side wall tubes 150 on the same side, then the furnace rear wall tubes 155, then the other side wall tubes 150, then the other side front wall tubes 160, then the vertical header 140 where the fluid exits at the outlet connection 165.

The hot fluid finally exits at the outlet connection 165 from the top or more typically from the bottom of one of the side headers 140 to go to the user.

As shown in FIG. 1, the furnace bottom rear wall tubes 155 are configured such that they provide an access 190 to allow the furnace flue gases to flow underneath the convection tube bundles 40 and then upward until they exit through roof staggered tubes 200, then to the finned tube convection section 20 in direction of the stack 220.

This fluid circulation pattern is chosen when the generator is of the large type, with tubes of up to 2 inches of diameter, preferably 1.5 inch of diameter, aiming non limitatively for capacities of 90, 100, 125 and 150 million BTUs per hour, to avoid a high pressure drop given the high water flow rate.

Typically, the external size of the 100 million BTUs per hour model will be approximately 32 feet (about 9.8 m) long by 11 feet (about 3.4 m) wide and 14 feet (about 4.3 m) high, to which may be added a finned tube convection section 20 of an approximate height of 5 feet (about 1.5 m).

Figure 11:
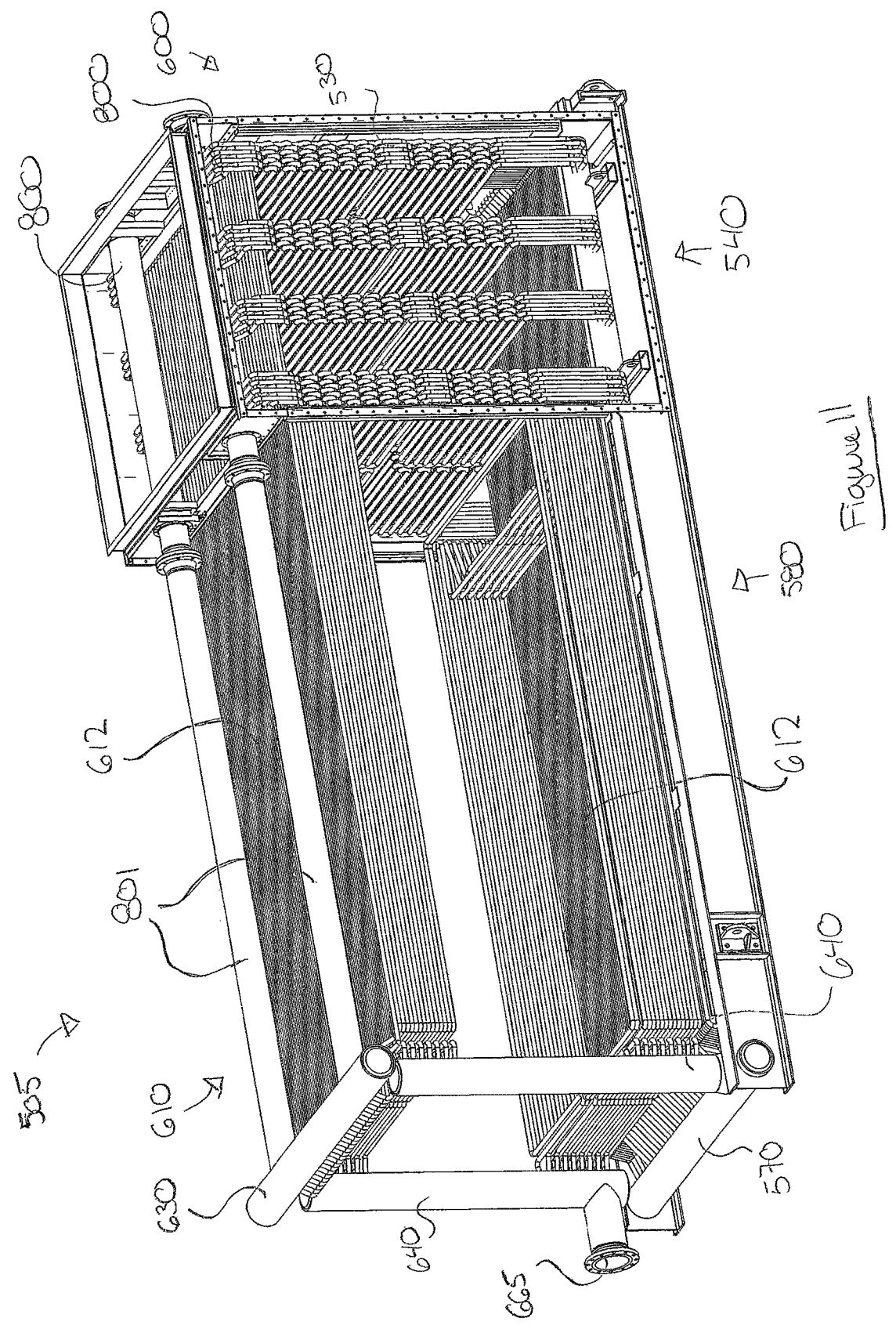

In another embodiment, now referring to FIGS. 11 to 16, the incoming hot fluid enters the generator 505 via a top header inlet (not shown) as in the embodiment of FIG. 1 which distributes the fluid to a finned tube convection section (not shown) and then to the two bundles 540 of convection tubes 530, as shown in FIG. 11.

In this embodiment, the arrangement of the tube bundles 540 provides for two (2) passes on the water side, from top to bottom in a first pass, and then from bottom to top in a second pass, after which the fluid enters at the rear top headers 800 and exits at the top headers 801 in the direction of the front top header 630.

Each bundle 540 outlet header 800 is connected with a header 801 to the front top header 630. The fluid from the top header 630 is fed to the tubes 612 forming the ceiling 610 of the furnace, then the rear wall 600 and the tubes 612 being part of floor 580 and ends in the front horizontal bottom header 570. From there, the fluid is fed to one of the vertical side headers 640 where the furnace wall tubes (not shown for clarity) are connected.

The fluid will then circulate in the front wall tubes in a vertical section that covers about half of the front wall 660, over a first one of the sides 650 of the furnace, over the rear wall 655 of the furnace, over the second one of the sides 650 of the furnace, over the remaining half of the front wall 660, and finally into the other front vertical header 640 before exiting the generator 505 at the outlet connection 665.

Figure 14:
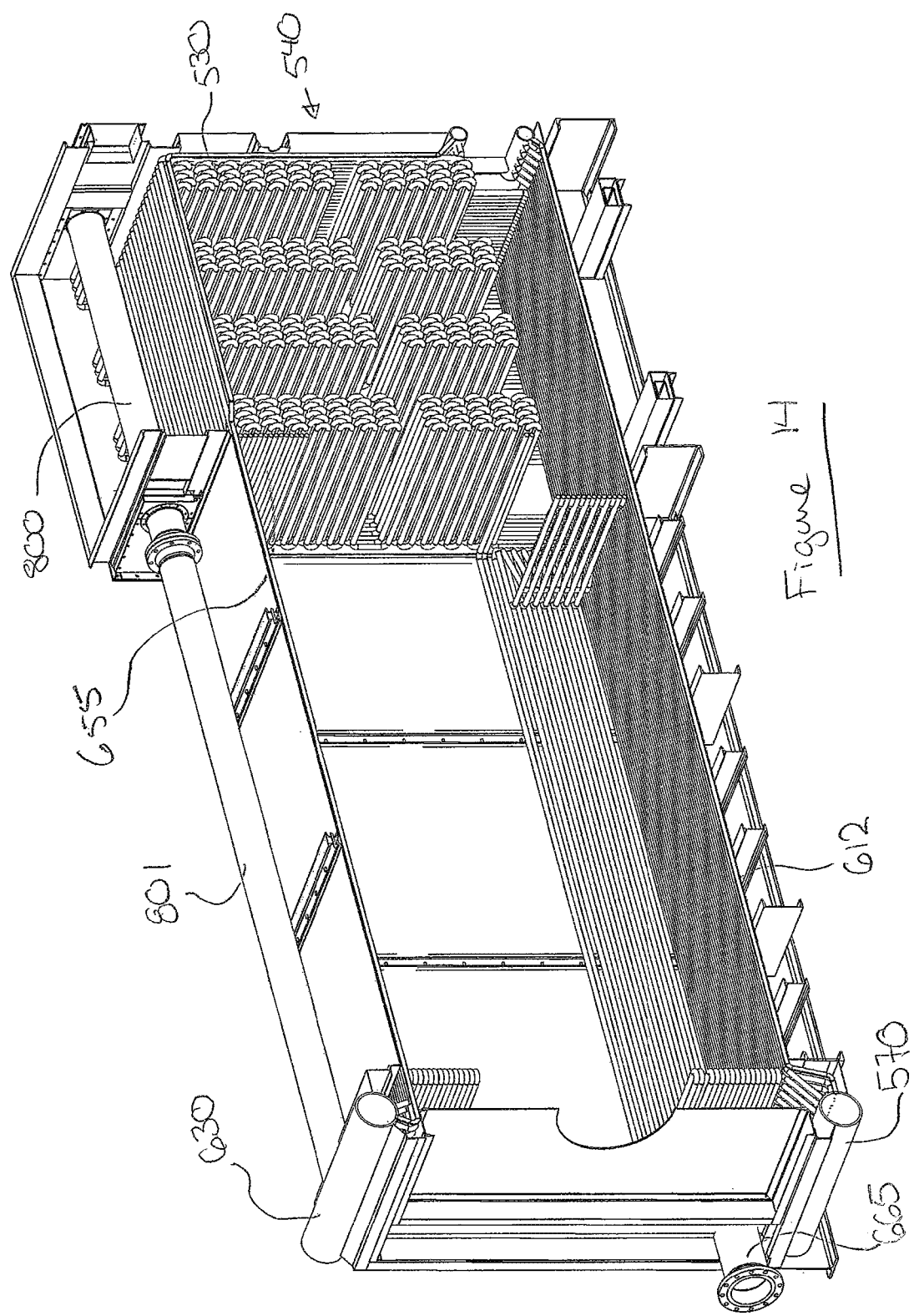
FIG. 14 is a front perspective cross-sectional view of the high temperature fluid generator of FIG. 11, cut vertically along the center line.
Figure 15:
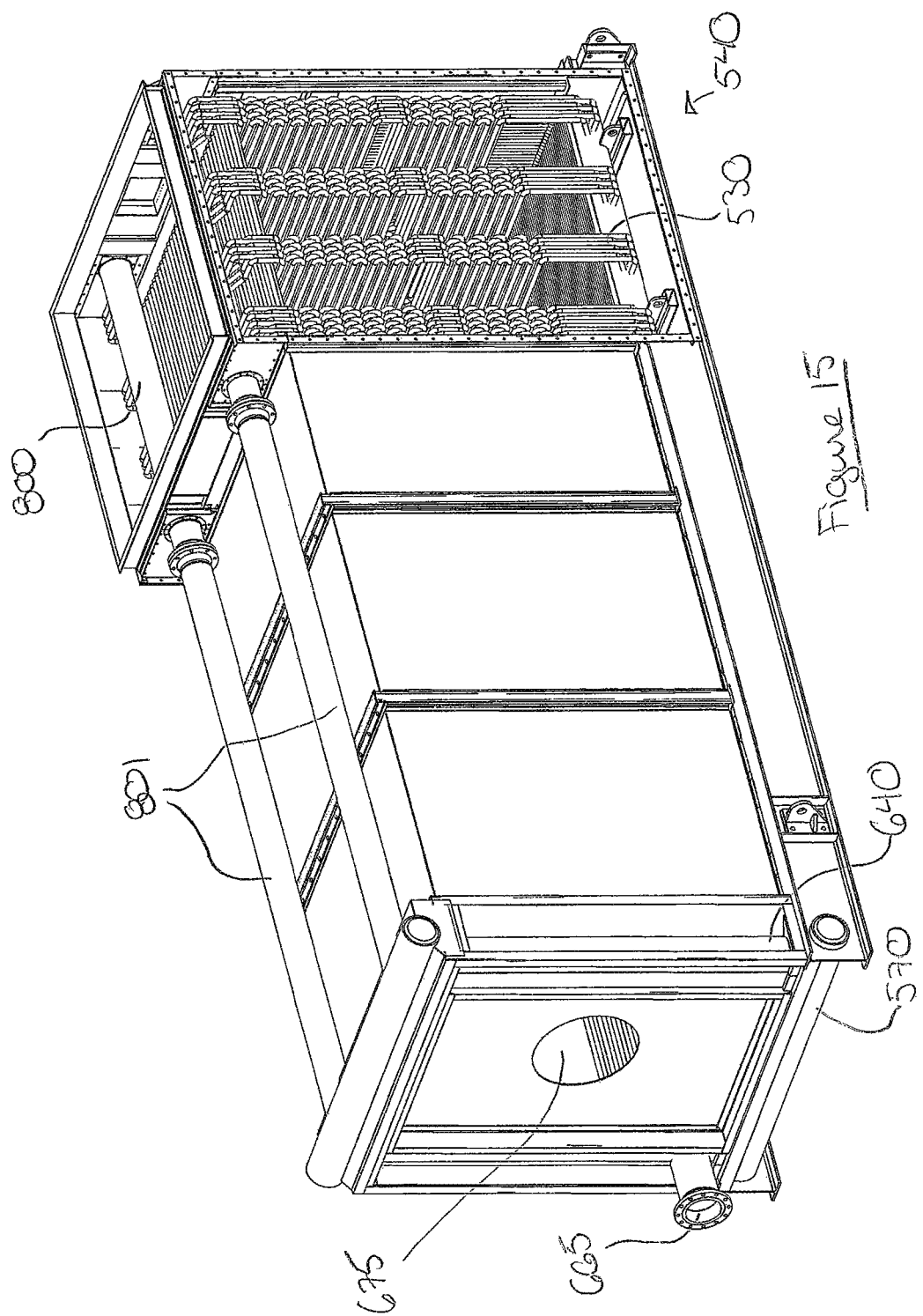
FIG. 15 is a side perspective view of the high temperature fluid generator of FIG. 11, without the doors on the convection section.
Figure 16:
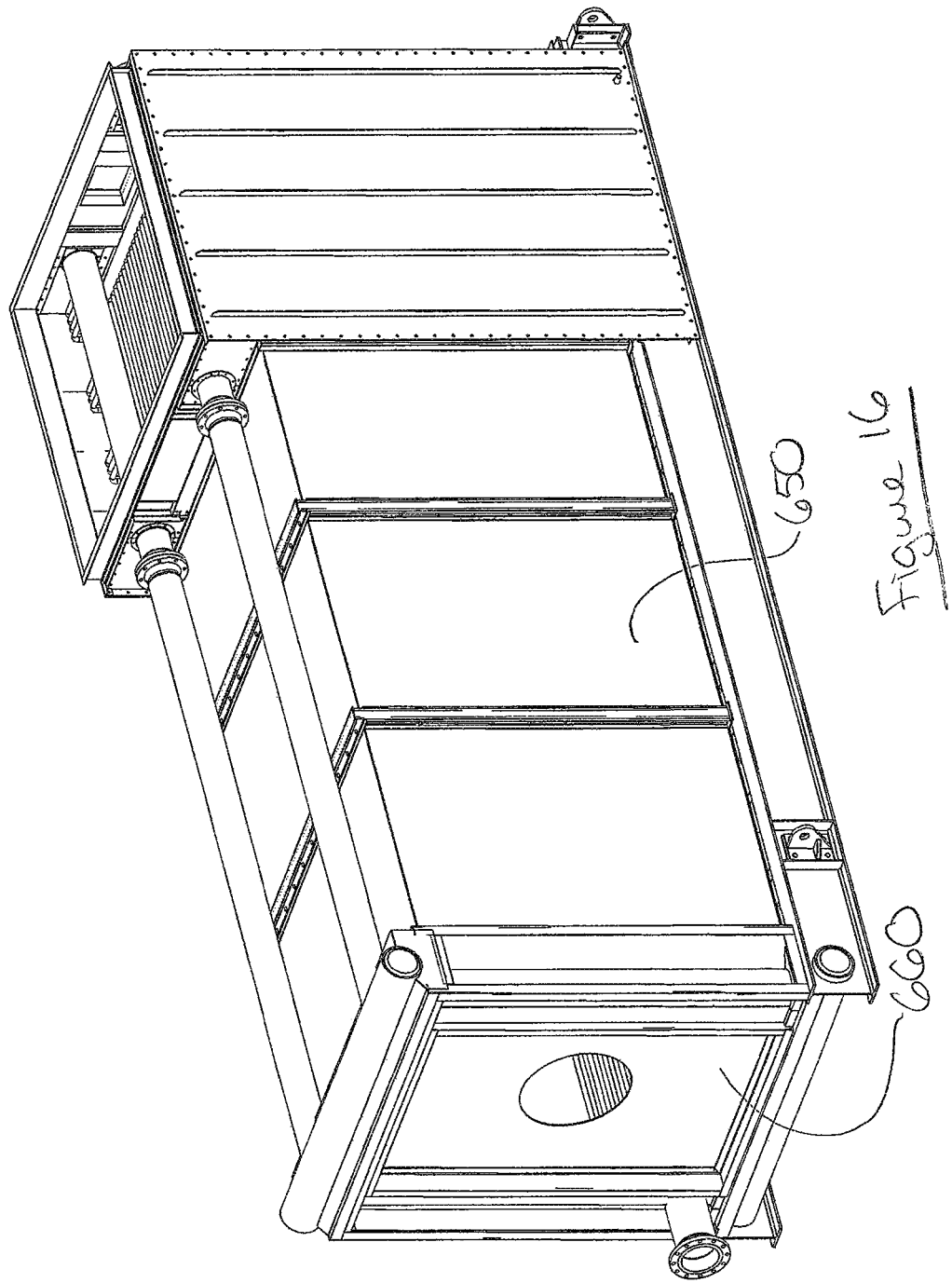
FIG. 16 is another side perspective view of the high temperature fluid generator of FIG. 11, with the doors on the convection section.

The furnace front wall tubes are arranged to provide a circular opening 675, as shown in FIGS. 14-16, for the burner and allow for thermal expansion. The generator rear wall 600 has an access door 620 for inspection, maintenance and repairs, if need be.

This fluid circulation pattern, including the double pass pattern in the convection section, is adopted when the generator is of the smaller type, with tubes of up to 1.5 inch of diameter, preferably 1.25 inch of diameter, aiming non limitatively for capacities of 50, 55, 62.5 and 75 million BTUs per hour. Typically, the external size of the 50 million BTUs per hour model will be approximately 26 feet (about 7.9 m) long by 8 feet 4 inches (about 2.5 m) wide and 12 feet (about 3.7 m) high, to which may be added a finned tube convection section 20 of an approximate height of 3 feet 6 inches (about 1.1 m).

Although both embodiments previously described are functional without the addition of the finned tube convection section 20, which constitutes an additional convective tube bundle, this addition is recommended when optimal generator performance is sought. Typically, when the design is optimized, an overall efficiency ratio of 82% or more may be reached, in function of the fluid operating parameters. For example, such an efficiency level can be reached in the generators of the larger type, with a finned tube convection section 20, with water intake at 250 degrees Fahrenheit (121 degrees Celsius), and output at 350 degrees Fahrenheit (177 degrees Celsius), operated with natural gas.

For the generators of the larger type, it has been found that it was desirable, in order to reach the efficiency level sought after, to provide the generator with a finned tube convection section 20.

For a generator of the smaller type, as shown in FIG. 3, an efficiency of 80% may be reached without the addition of a finned tube convection section 20.

A high temperature fluid generator in accordance with the principles of the present invention can be shop-manufactured as a package or site-erected depending upon the conditions.

The tubes are covered with a gas tight steel inner casing, properly reinforced for pressure firing. That inner casing is then adequately insulated then covered by an outer casing. That arrangement reduces the heat losses by radiation.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A high temperature fluid generator for heating a fluid, the high temperature fluid generator comprising:
   a furnace module comprising
      a housing having a front wall, first side wall, second side wall, rear wall, ceiling, and floor;
      a combustion chamber adapted for producing heat and hot combustion gases; and
      a plurality of heating tubes located inside the housing for collecting heat from the combustion chamber, the plurality of heating tubes extending along the front wall, first side wall, second side wall, rear wall, ceiling, and floor of the housing such that the plurality of heating tubes substantially covers the combustion chamber to cool the furnace module;
   a convection module extending from the rear wall of the combustion chamber and comprising a plurality of convection tubes fluidly connected with the heating tubes of the furnace module; the convection module being in communication with the furnace module to receive the hot combustion gases from the furnace module through the rear wall for heating the convection tubes wherein the convection tubes are arranged to substantially cover the floor, ceiling, rear, front and side walls of the convection module; and
   a series of fluidly interconnected headers into which the fluid to be heated can circulate, the headers being fluidly connected to the convection tubes to receive heated fluid therefrom;
   wherein the interconnected headers are located outside of the housing for supporting the heating tubes of the furnace module and contributing as such to the structure of the high temperature fluid generator; and
   wherein the fluid circulates in the convection tubes where the fluid is heated before circulating into the interconnected headers and the heating tubes where the fluid is further heated by the combustion chamber.

2. The high temperature fluid generator of claim 1, wherein the convection module is covered by some of the convection tubes forming as such a top, floor, rear, front and side walls of the convection module.

3. The high temperature fluid generator of claim 1, wherein the fluidly interconnected headers comprise two lateral bottom headers, two lateral top headers, a front bottom header, a front top header and two front side headers.

4. The high temperature fluid generator of claim 1, wherein the interconnected headers form a path along the convection and furnace modules in order to further heat the fluid with the heat from the modules.

5. The high temperature fluid generator of claim 1, wherein the plurality of convection tubes includes at least first and second removable bundles of convection tubes moveable through first and second sides of the convection module such that the first and second bundles substantially cover the front and rear walls of the convection module.

6. The high temperature fluid generator of claim 5, wherein each bundle of convection tubes is movably mounted in an enclosure of the convection module.

7. The high temperature fluid generator of claim 5, wherein each bundle of tubes is slidingly mounted on rails, wheels or hydraulics.

8. The high temperature fluid generator of claim 5, further comprising frame elements to support the bundles.

9. The high temperature fluid generator of claim 5, wherein the first and second bundles of convection tubes moveable through the sides of the convection module run in serpentine fashion from a top to a bottom of the convection module.

10. The high temperature fluid generator of claim 1, wherein the convection tubes are arranged in a staggered pattern in the convection module.

11. The high temperature fluid generator of claim 1, further comprising a finned tube convection section located above the convection module, the finned tube section comprising finned convection tubes fluidly connected to the convection tubes of the convection module for further heating the fluid.

12. The high temperature fluid generator of claim 11, wherein the convection module comprises structural frame elements to support the convection tubes and the finned tube convection section.

13. The high temperature fluid generator of claim 1, wherein the furnace module and the convection module are in fluid communication through a rear access gas outlet allowing the hot combustion gases to flow from the furnace chamber to the convection module.

14. The high temperature fluid generator of claim 1, further comprising a gas outlet operatively connected to the convection module to evacuate the gas from the high temperature fluid generator.

15. The high temperature fluid generator of claim 1, wherein the convection tubes have a diameter of about 1.5 inch.

16. The high temperature fluid generator of claim 1, wherein the convection tubes are covered with a gas tight steel inner casing reinforced for pressure firing.

17. The high temperature fluid generator of claim 1, wherein the fluid is an aqueous fluid, a thermal oil or a mixture thereof, or a gas.

18. The high temperature fluid generator of claim 1, wherein the fluid is water, glycol or mixture thereof.

19. A high temperature fluid generator for heating a fluid, the generator comprising:
   a furnace module comprising:
      a housing having a front wall, first side wall, second side wall, rear wall, ceiling, and floor;
      a combustion chamber adapted for producing heat and hot combustion gases; and
      a plurality of heating tubes located inside the housing for collecting heat from the combustion chamber, the plurality of heating tubes extending along the front wall, first side wall, second side wall, rear wall, ceiling, and floor of the housing such that the plurality of heating tubes substantially covers the combustion chamber to cool the furnace module; and
   a convection module comprising:
      a plurality of convection tubes arranged in the convection module; the convection module being in communication with the furnace module to receive the hot combustion gases from the furnace module for heating the convection tubes;
      wherein the plurality of convection tubes includes at least first and second removable bundles of convection tubes moveable through first and second sides of the convection module such that the first and second bundles substantially cover front and rear walls of the convection module, and
   a series of fluidly interconnected headers into which the fluid to be heated can circulate, the headers being fluidly connected to the convection tubes to receive heated fluid therefrom;
   wherein the interconnected headers are located outside of the housing for supporting the heating tubes of the furnace module and contributing as such to the structure of the high temperature fluid generator;
   wherein the fluid circulates in the convection tubes where the fluid is heated.

20. The high temperature fluid generator of claim 19, wherein each bundle of tubes is slidingly mounted on rails, wheels or hydraulics.

21. The high temperature fluid generator of claim 19, further comprising frame elements to support the bundles.

22. The high temperature fluid generator of claim 19, wherein the furnace module further comprises a plurality of heating tubes fluidly connected to the convections tubes and at least partially covering the combustion chamber for cooling the combustion chamber wherein the fluid from the convection tubes then circulates into the cooling tubes and further heating the fluid by the combustion chamber.

23. The high temperature fluid generator of claim 22, wherein the combustion chamber of the furnace module is covered by the heating tubes and the convection module is covered by some of the convection tubes, said heating tubes and said some of the convection tubes forming as such a top, floor, rear, front and side walls of the high temperature fluid generator.

24. The high temperature fluid generator of claim 23, further comprising fluidly interconnected headers fluidly connected to the convection tubes to receive heated fluid therefrom.

25. The high temperature fluid generator of claim 24, wherein the headers extend along at least one of the walls of the generator contributing as such to the structure of the high temperature fluid generator.

26. The high temperature fluid generator of claim 25, wherein the headers form a path along the convection and furnace modules in order to further heat the fluid with the heat from the modules.

27. The high temperature fluid generator of claim 19, wherein the first and second bundles of convection tubes moveable through the sides of the convection module run in serpentine fashion from a top to a bottom of the convection module.

28. The high temperature fluid generator of claim 19, wherein the convection tubes are arranged in a staggered pattern in the convection module.

29. The high temperature fluid generator of claim 19, further comprising a finned tube convection section located above the convection module, the finned tube section comprising finned convection tubes fluidly connected to the convection tubes of the convection module for further heating the fluid.

30. The high temperature fluid generator of claim 29, wherein the convection module comprises structural frame elements to support the convection tubes and the finned tube convection section.

31. The high temperature fluid generator of claim 19, wherein the furnace module and the convection module are in fluid communication through a rear access gas outlet allowing the hot combustion gases to flow from the furnace chamber to the convection module.

32. The high temperature fluid generator of claim 19, further comprising a gas outlet operatively connected to the convection module to evacuate the gas from the high temperature fluid generator.

33. The high temperature fluid generator of claim 19, wherein the convection tubes have a diameter of about 1.5 inch.

34. The high temperature fluid generator of claim 19, wherein the convection tubes are covered with a gas tight steel inner casing reinforced for pressure firing.

35. The high temperature fluid generator of claim 19, wherein the fluid is an aqueous fluid, a thermal oil or a mixture thereof, or a gas.

36. The high temperature fluid generator of claim 19, wherein the fluid is water, glycol or mixture thereof.

37. A method for producing a high temperature fluid, the method comprising the steps of:
   a) injecting a fluid to be heated through at least two removable bundles of convection tubes movably mounted into a convection module through first and second sides of the convection module such that the bundles substantially cover front and rear walls of the convection module for heating the fluid; and
   b) cooling a combustion chamber producing heat and hot combustion gases by injecting the fluid heated in step a) through a plurality of heating tubes located inside of a housing and extending along the front wall, first side wall, second side wall, rear wall, ceiling, and floor thereof such that the plurality of heating tubes substantially covers the combustion chamber, the fluid being further heated by the combustion chamber;

wherein the convection module is in communication with the combustion chamber to receive the hot combustion gases from the combustion chamber for heating the convection tubes; and wherein a series of fluidly interconnected headers are fluidly connected to the convection tubes to receive heated fluid therefrom; wherein the interconnected headers are located outside of the housing for supporting the heating tubes of the furnace module.

38. A method of claim 37, wherein the at least two bundles of convection tubes moveable through the sides of the convection module run in serpentine fashion from a top to a bottom of the convection module.

* * * * *